(No Model.)

T. R. FERRALL.
ANTI FRICTIONAL BEARING.

No. 321,351. Patented June 30, 1885.

WITNESSES.
Charles H. Fogg
Helen A. Curtis

INVENTOR.
Thomas R. Ferrall
by Alban Andrew
his atty.

United States Patent Office.

THOMAS R. FERRALL, OF BOSTON, MASSACHUSETTS, ASSIGNOR TO THE BAGNALL & LOUD BLOCK COMPANY.

ANTI-FRICTIONAL BEARING.

SPECIFICATION forming part of Letters Patent No. 321,351, dated June 30, 1885.

Application filed May 22, 1885. (No model.)

*To all whom it may concern:*

Be it known that I, THOMAS R. FERRALL, a citizen of the United States, residing at Boston, in the county of Suffolk and State of Massachusetts, have invented certain new and useful Improvements in Anti-Frictional Bearings; and I do hereby declare that the same are fully described in the following specification and illustrated in the accompanying drawings.

This invention relates to improvements in anti-frictional bearings of that kind in which two sets of rollers are used, one set varying in size from the other set, and the individual members of one set arranged alternately with the individual members of the other. In this kind of anti-frictional bearings the usual ring-shaped regulators or dividers are dispensed with, the set of smaller rollers serving as dividers to prevent the larger rollers from coming in contact with each other. In this anti-frictional bearing the larger set of rollers lie in contact with the interior cylindrical surface of the outer shell, as well as with the exterior cylindrical surface of the central sleeve, hub, or shaft; but the smaller set of rollers are prevented from touching such surfaces, and only come in contact with the larger set of rollers.

For the purposes of keeping the rollers in place within the shell, I provide the interior portion of one end of the latter with an annular groove, in which is laid an expansive split ring, as will hereinafter be more fully shown and described, reference being had to the accompanying drawings, where—

Figure 1:
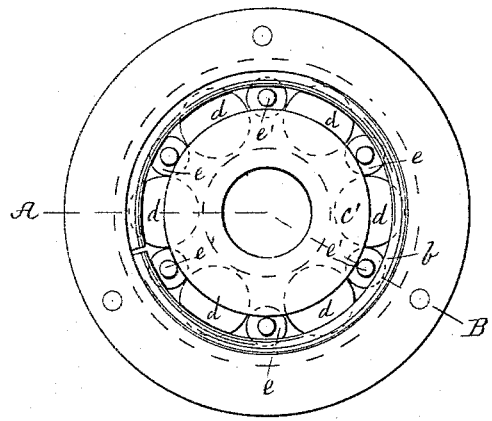
Figure 4:
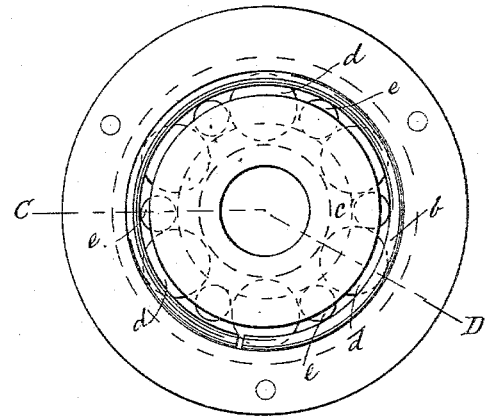
Figure 2:
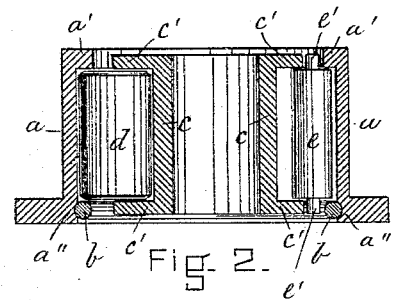
Figure 5:
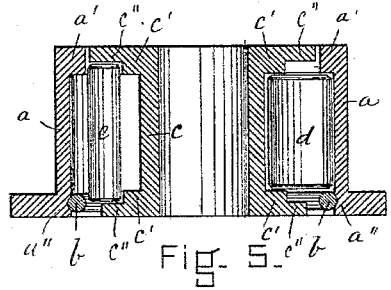
Figure 3:
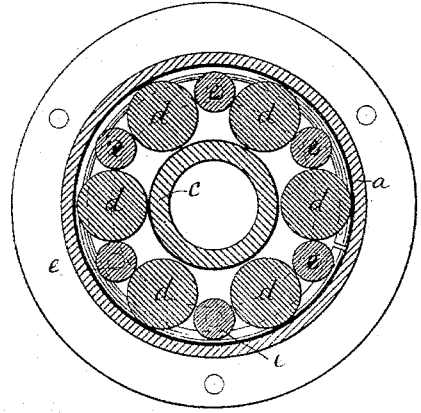
Figure 6:
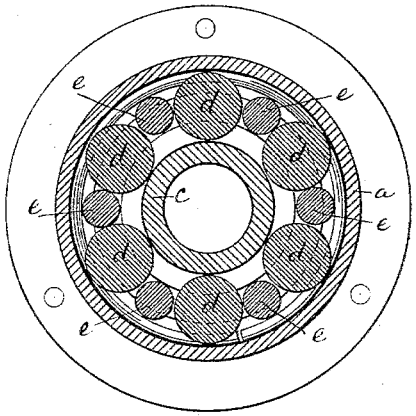

Figure 1 represents an end view of my improved anti-frictional bearing, in which the smaller set of rollers are provided with reduced journal ends for their guidance. Fig. 2 represents a central longitudinal section on the line A B, shown in Fig. 1, and Fig. 3 represents a cross-section of the bearing and rollers shown in Fig. 1. Fig. 4 represents an end view of a modified form of my improved bearing, in which the reduced journal ends on the smaller set of rollers are dispensed with. Fig. 5 represents a longitudinal section on the lines C D, shown in Fig. 4, and Fig. 6 represents a cross-section of the bearing and rollers shown in Fig. 4.

Similar letters refer to similar parts wherever they occur on the different parts of the drawings.

In Figs. 1, 2, and 3, $a$ represents a cylindrical shell, as usual made open in one end, and provided in the other end with an inwardly-projecting annular flange, $a'$, as shown. The open end of shell $a$ is provided with an annular groove or recess, $a''$, in which is laid the expansive split spring-ring $b$ after the two sets of rollers and central bearing-sleeve are put in place within said shell $a$.

Within the shell $a$ is concentrically located the bearing sleeve or hub $c$, having annular flanges $c'$ $c'$ in its ends, as shown in Figs. 1 and 2.

In the annular space between the exterior of sleeve or hub $c$ and the interior of shell $a$ are located the two sets of rollers $d$ and $e$, the former being the largest, and serve as anti-frictional rollers, and are adapted to roll on interior of shell $a$, as well as on the exterior of sleeve or hub $c$, as shown in Fig. 3, and said anti-frictional rollers $d$ are prevented from a longitudinal motion by being loosely confined between the flanges $c'$ $c'$ on sleeve $c$, as well as between flange $a'$ and spring-ring $b$ on the shell $a$, as shown in Fig. 2. The smaller set of rollers, $e$ $e$, are arranged alternately between the larger rollers, $d$ $d$, as shown, in such a manner as not to come in contact with the interior of shell $a$ and exterior of sleeve or hub $c$, and only serve as regulators between the anti-frictional rollers $d$ $d$, to keep each one of the latter in its proper relative position to the next one in the series, as shown. To retain the regulator-rolls $e$ $e$ in such position between the rollers $d$ $d$, I provide the ends of the regulator-rolls $e$ $e$ with reduced cylindrical projections $e'$ $e'$, (shown in Figs. 1 and 2,) which are loosely guided in one end in the annular open space between interior shell-flange, $a'$, and sleeve or hub flange $c'$, and in the other end in the annular open space between the spring-ring $b$ and sleeve or hub-flange $c'$, as shown in Fig. 2. The regulator-rolls $e$ $e$ are prevented from a longitudinal motion by being loosely confined between the sleeve or hub flanges $c'$ $c'$, interior shell-flange, $a'$, and spring-ring $b$, as shown in Fig. 2. By this arrangement the rollers $d$ and $e$ are properly confined within the shell $a$, and between it and the sleeve or hub $c\ c'\ c'$, in such a manner that only the rollers $d\ d$ will touch and roll on the interior cylindrical surface of shell $a$ and exterior cylindrical surface of bearing sleeve or hub $c$, the rollers $e\ e$ being held from contact with such cylindrical surfaces of shell $a$ and sleeve or hub $c$, and are only permitted to touch and roll against the anti-frictional rollers $d\ d$, as described and shown.

The modification of my invention shown in Figs. 4, 5, and 6 is precisely like the one above described, with this difference, that I dispense with the reduced cylindrical projections on the ends of regulator-rolls $e\ e$, and make them of an even size throughout their lengths, as shown in Fig. 5, and make them a little longer than the anti-frictional rollers $d\ d$. In this modification I make annular recesses $c''\ c''$ on the interior surfaces of the bearing-sleeve or hub-flanges $c'\ c'$, as shown in Fig. 5, in which the ends of rollers $e\ e$ project, and are so guided as not to move toward the center of the bearing. The rollers $e\ e$ in this modification are prevented from moving too far outward by coming in contact in one end with sleeve-flange $a'$, and in the other with spring-ring $b$, as shown in Fig. 5.

Having thus fully described the nature, construction, and operation of my invention, I wish to secure by Letters Patent, and claim—

1. The herein-described anti-friction device, consisting of two sets of rollers, $d$ and $e$, located within the annular space between the shell $a$ and flanged sleeve or hub $c\ c'$, the larger rollers, $d$, bearing against the shell and sleeve, and the smaller rollers, $e$, located alternately between the larger rollers without touching the shell and sleeve, the whole system of rollers being retained within the shell $a$ by means of flange $a'$ in one end and expansive spring-ring $b$ in the other, as set forth.

2. In an anti-frictional bearing, the shell $a$, with its end flange, $a'$, and spring-ring $b$, as described, the flanged hub or sleeve $c\ c'\ c'$, combined with two sets of rollers, $d$ and $e$, the latter serving as regulators for holding the former at a proper distance apart, and having reduced journal ends $e\ e'$, as and for the purpose set forth.

3. In an anti-frictional bearing, the shell $a$, with its end flange, $a'$, and spring-ring $b$, as described, the flanged hub or sleeve $c\ c'\ c'$, having interior annular recesses, $c''\ c''$, combined with the anti-friction rollers $d\ d$ and regulator-rolls $e\ e$, all arranged in a manner and for the purpose as set forth.

In testimony whereof I have affixed my signature in presence of two witnesses.

THOMAS R. FERRALL.

Witnesses:
ALBAN ANDRÉN,
HERBERT LOUD.